J. FARRINGTON.
Harvester Rakes.
No 116,037.
Patented June 20, 1871.
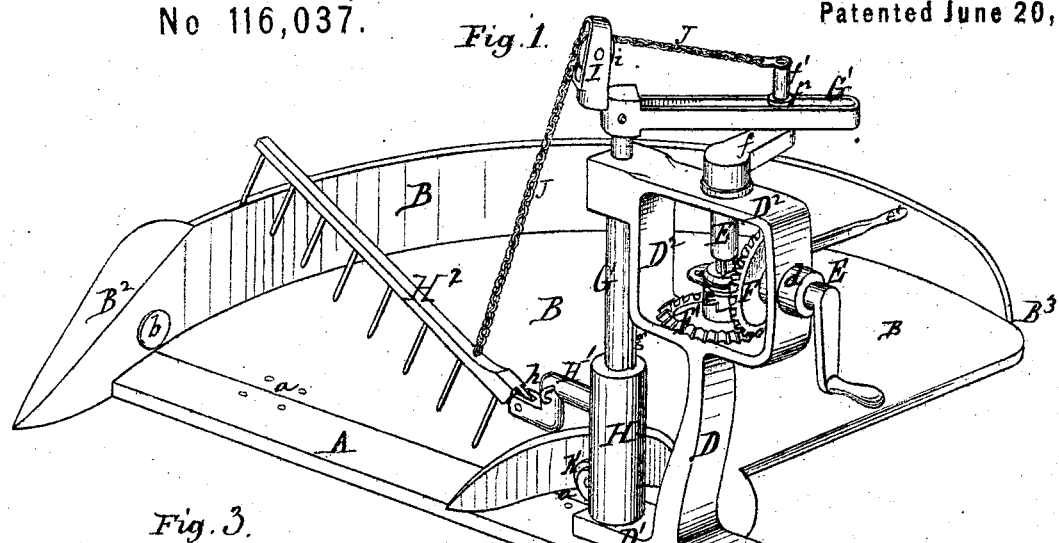
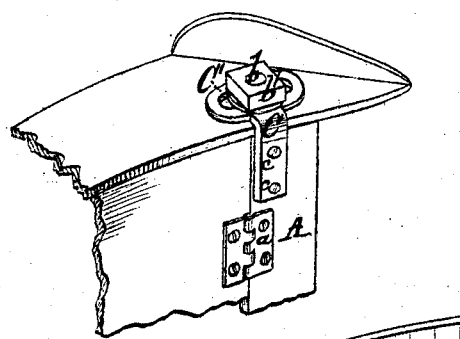
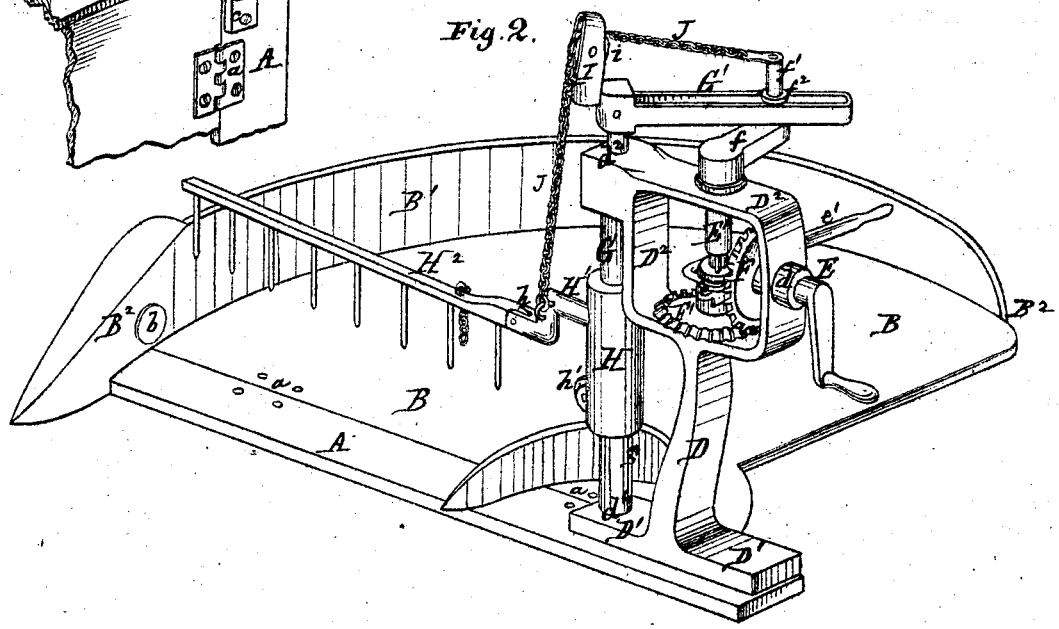
Witnesses.
Alex? Mahon
H. H. Doubleday
Inventor
Joel Farrington
by atty. A. M. Smith

UNITED STATES PATENT OFFICE.

JOEL FARRINGTON, OF CORRY, PENNSYLVANIA.

IMPROVEMENT IN HARVESTERS.

Specification forming part of Letters Patent No. 116,037, dated June 20, 1871.

*To all whom it may concern:*

Be it known that I, JOEL FARRINGTON, of Corry, county of Erie, State of Pennsylvania, have invented a new and useful Improvement in Harvesting-Machines, of which the following is a full, clear, and exact description, reference being had to the accompanying drawing making part of this specification, in which—

Figure 1 is a perspective view of a harvester-platform with the improvements in the rake attachment applied. Fig. 2 is a similar view, showing a modification in the arrangement of the chain or cord for lifting the rake; and Fig. 3 is a perspective view of the divider and outer end of the finger-bar and platform, showing the means for effecting the adjustment of the platform.

Similar letters of reference denote corresponding parts in all the figures.

The invention relates for the first part to that class of machines employing a vibrating sweep-rake; and consists in a novel arrangement of means for lifting the rake for its return or backward movement, and for dropping the same upon the platform preparatory to discharging the grain therefrom. Second the invention relates more particularly to that class of machines employing a vibrating cutter-frame, or one in which the cutting apparatus is raised and lowered in the arc of a circle, and in which such adjustment changes the angle of the grain-platform to the surface of the ground; and this part of the invention consists in a novel means for adjusting the angle of the platform to adapt it to different heights of cut.

In the accompanying drawing, A represents the finger-bar of the machine, made and applied to the main frame in any manner usual in either rigid or hinged-bar machines. The platform B, connected with bar A, is what is usually denominated a quadrant or circular platform—that is to say, it is made triangular in form with its outer or grain side curved or otherwise made to conform substantially to the path described by the outer end of a vibrating or sweep-rake. Said platform is provided on its outer edge with a grain-guard, $B^1$, extending from the divider $B^2$ at its front outer corner to the rear corner at $B^3$, and is connected by hinges at $a$ to the rear edge of the finger-bar in such manner as to permit a vertical adjustment of the rear end of the platform. The outer end of the finger-bar or the shoe applied thereto has a standard, C, secured to it by bolts at $c$ passing through the bar or shoe and through the foot of the standard, which at its upper end is expanded in width and slotted, as shown at $C'$, and a bolt, $b$, passing through the platform-guard $B^1$ or divider $B^2$ attached to the hinged platform, and, through the slotted standard, serves, in connection with a nut, $b'$, to hold the platform at any desired angle of adjustment. By this arrangement the variations in the angle of the platform, consequent upon the adjustment of the cutting apparatus to different heights, may be compensated for, and the angle of relation of the platform to the surface of the ground may be readily changed to suit the varying conditions and kinds of grain operated upon. Upon the inner front corner of the platform or finger-bar, or upon the shoe or frame, as may be preferred, is mounted the gear-standard D, provided with the broad base or foot $D^1$, through which it is bolted to its support, and at its upper end with a yoke, $D^2$, in which the rake-driving gear is mounted, as follows, viz.: E is a horizontal shaft, to which motion is imparted from the main driving-wheel or axle of the machine in any convenient manner. Said shaft is mounted in a sleeve, $d$, of yoke $D^2$, and is armed at its inner or platform end with a bevel-wheel, F, which meshes with and drives a bevel-wheel, $F'$, mounted loosely on the lower end of a vertical crank-shaft, $E'$. A sliding clutch, $e$, feathered on shaft E, and operated by a hand-lever, $e'$, arranged in position to be operated by the attendant riding on the machine, serves to engage the bevel-wheel $F'$ with its shaft E for driving the same when desired. The upper end of shaft $E'$ is provided with a crank-arm, $f$, and with a wrist, $f^1$, having a friction-roller, $f^2$, mounted thereon, which works back and forth in a slot in a horizontal arm, $G'$, keyed to a vertical rock-shaft, G, mounted in bearings at $d^1$ $d^2$ formed in the gear-standard D, said crank-arm thereby serving by its rotation to impart a vibratory motion to arm $G'$ and rock-shaft G. The rock-shaft G is provided between its bearings $d^1$ $d$ with a feather, $g$, (or if preferred it may be made either square or polygonal in form,) and has mounted upon it a tubular slide or sleeve, H, which vibrates with the shaft G and carries with it the rake-arm rigidly connected thereto, thereby imparting a vibratory movement to the rake. $H^1$ represents the rake-head, which is hinged or pivoted at $h$ to the vibrating arm $H^1$ in such manner as to permit its outer end to be raised or thrown up for the return or back stroke, as will be explained. The upper end of rock-shaft G or arm G', attached thereto, is provided with a small pivoted yoke or with upright lugs or ears I, in which is mounted a grooved friction-roller, $i$, over which a chain or cord, J, passes; said chain extending between and connecting the pivoted rake-head $H^2$, (see Fig. 1,) or rake-arm and sleeve H, (see Fig. 2,) with the crank-wrist $f^1$, which serves thereby to impart the necessary rising and falling as the vibratory movements of the rake, as follows, viz.: Supposing the parts to be in position shown in the drawing, and in which the rake is represented as approaching the completion of its backward or return stroke and in the act of descending upon the platform preparatory to removing the grain therefrom, a continued rotation of the wrist (in the direction indicated by the arrows) causes the wrist to slide inward through the slot in arm G' toward shaft G, thereby slacking the chain or cord J and allowing the rake to drop upon the platform either by turning on its hinge at $h$, or by the descent of slide H, as the case may be; after which, by the further movement of wrist $f^1$, the arm G' and rock-shaft G are vibrated and the rake sweeps backward, removing the grain from the platform. By the time the rake has reached the discharging end of the platform the wrist begins its outward movement through the slotted arm, and the wrist as it recedes from the shaft operates through the chain or cord J to lift the rake either upon its hinge or bodily, with its sleeves H, to a suitable height to be out of the way of the grain on the platform upon its return stroke, which is effected by the continued rotation of crank $f$ in a manner that will be readily understood.

Having now described the invention, what is claimed as new, and sought to be secured by Letters Patent, is—

1. The slide or sleeve H and rock-shaft G, in combination with the rake, operating substantially as and for the purpose described.

2. The crank-wrist $f^1$, in combination with the rock-shaft G, slotted arm G', and chain or cord J for giving the vibratory and rising-and-falling movements to the rake, as described.

3. The slotted standard $c$ and bolts $b$, in combination with the hinged platform for adjusting the angle of said platform, as described.

In testimony whereof I have hereunto set my hand this 23d day of November, A. D. 1871.

JOEL FARRINGTON.

Witnesses:
  S. B. BROOKS,
  L. R. SPRAGUE.